March 7, 1967  E. B. TIDD ETAL  3,307,859
SADDLE FITTING AND CONNECTION FOR BRANCHING PIPING SYSTEMS
Filed Sept. 28, 1964

INVENTORS
EDWIN BENNETT TIDD
EDGAR MILTON PETERSON
BY Richard C. Lindberg
ATTORNEY

3,307,859
SADDLE FITTING AND CONNECTION FOR BRANCHING PIPING SYSTEMS
Edwin Bennett Tidd, Park Ridge, and Edgar Milton Peterson, Clarendon Hills, Ill., assignors to International Telephone and Telegraph Corporation, New York, N.Y., a corporation of Maryland
Filed Sept. 28, 1964, Ser. No. 399,744
1 Claim. (Cl. 285—39)

The present invention relates generally to improvements in piping and tubing circuits, and has particular reference to an improved saddle fitting and connection which can be readily made in the field by simple soldering, brazing or welding operations.

Heretofore complex piping circuits, as for example in hot water heating systems, the branches of the system have been connected to the supply mains by the interposition of T's or other commercial fittings into the supply mains, the branches in turn being connected to such fittings. When such connections are made in the field, such operations have entailed many operations such as tapping, threading, brazing, welding or the like.

More modern techniques, especially for hot water heating, have indicated the desirability of connecting supply and return mains to the boiler initially, and subsequently making field connections for the radiation structures included in the system. More modern construction techniques have shown the desirability of the construction of such supply and return mains from non-ferrous materials, such as copper tubing, to minimize the number of field connections. Such material is generally supplied in large coils which can readily be strung with a minimum amount of effort. Once in place, the branch connections have heretofore been made by cutting a section from the main and inserting a T which is generally soldered or sweated into the main. While the foregoing operations are generally acceptable, they are costly from the standpoint of original cost of the fittings, as well as the labor for the described installation. It is to the reduction in cost of making the branching connections that this invention is particularly directed.

According to the present invention, the described branching connections are instead made simply through the medium of a reinforcing "patch" or saddle fitting which may be die cut from any suitable metal and preferably soldered or otherwise secured to the main. The aforesaid saddle fitting may be formed in a coining operation to have a contour corresponding to the O.D. of the supply main with an integrally formed short ferrule adapted to be in alignment with a hole formed in the supply main. The ferrule has an I.D. corresponding to the O.D. of the branching pipe to be connected thereat. The branching pipe is adapted to be located in the ferrule, and the amount of penetration thereof into the supply main is determined by suitably deforming the branching pipe, so that such deformation bears against the ferrule on the saddle. The entire assembly is adapted readily to be soldered together as an integral whole to the supply main in a simple field soldering operation.

With the foregoing considerations in mind it is a principal object of the invention to provide a simple structure for affording a branching connection from a supply main in, for example a hot water heating system.

Another object is to provide structure which can readily be soldered, brazed or welded to the supply main of a hot water heating system, and which will afford a branching connection to such main.

Yet another object is to provide a saddle fitting for a supply main of a fluid circulating system, which fitting can readily be soldered to the supply main and which will afford reinforcement for a branching pipe connected to the main, the branching pipe being likewise soldered to said saddle fitting to make an integral leak-free connection.

A still further object is to provide a saddle fitting for making a connection to a branch pipe connected to a supply main, said saddle fitting being adapted to fit over the supply main and have a tight soldered connection thereto, and being provided with a raised ferrule aligned with a drilled opening in the supply main and adapted to fit tightly with a branching pipe adapted to be subsequently soldered to said raised ferrule.

Other objects and important features of the invention will be apparent from a study of the specification following taken with the drawing which together described and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and purview of the subjoined claim.

Figure 2:
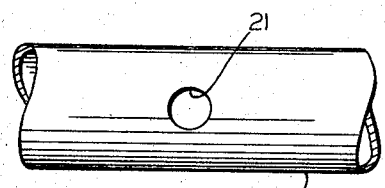
FIG. 2 is a perspective view of a portion of the main piping of the system seen in FIG. 1, and showing an opening therein for a branching connection thereto.
Figure 3:
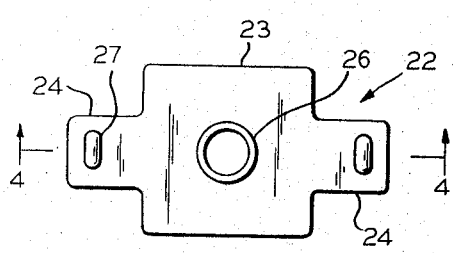
FIG. 3 is a plan view of a blank adapted to be formed into a saddle fitting according to the present invention, and showing an open ferrule therein adapted to register with the opening in the piping and adapted to receive a branch pipe thereat.
Figure 5:
FIG. 5 is a side view of a branching pipe adapted to be connected to the saddle fitting seen in FIGS. 3 and 4 when the same is formed and placed in position on the supply main.
Figure 4:
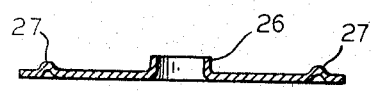
FIG. 4 is a section taken along the line 4—4 of FIG. 3 looking in the direction of the arrows.
Figure 7:
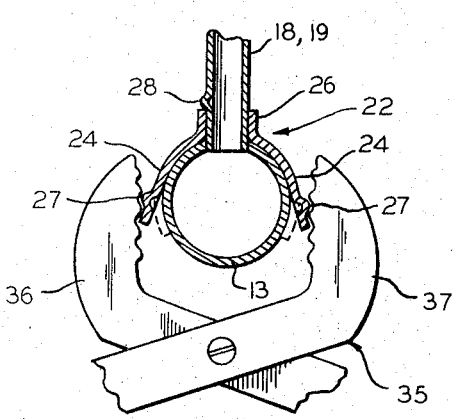
Figure 6:
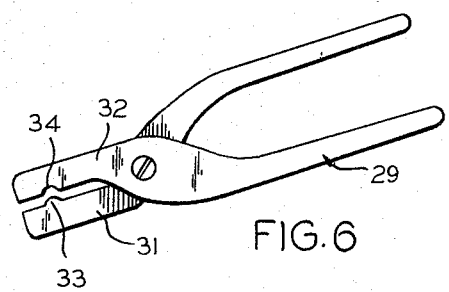

FIG. 6 is a view of a hand tool adapted to deform the branching pipe seen in FIG. 5, so as to limit the penetration thereof into the main pipe seen in FIG. 2; and FIG. 7 is a cross-sectional view through the fitting seen in FIGS. 3 and 4 showing the same completely formed and in position on the pipe seen in FIG. 2, the same being shown in assembled relationship with the branching pipe seen in FIG. 5, the entire assembly being secured to the pipe by a suitable gripping tool prior to making a fluid tight soldered or brazed connection.

Figure 1:
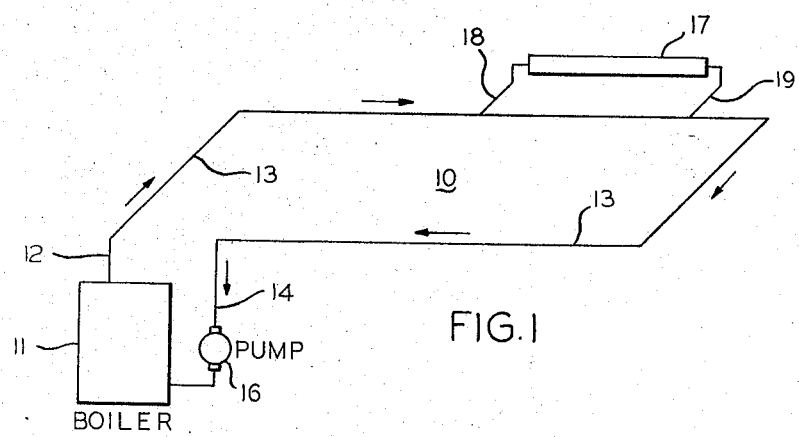
FIG. 1 is a schematic diagram showing the piping of a hot water heating system having the improved saddle fitting according to the present invention embodied therein.

Referring now to the drawing, the improved saddle fitting according to the present invention is adapted for use particularly in a fluid circulating system such as the hot water heating system portrayed in FIG. 1, and referred to generally by the reference numeral 10. Such a system includes a boiler 11 having a riser 12 extending upward therefrom for hot water, riser 12 being connected to a supply main 13 having a return connection to boiler 11 by return riser 14. A pump 16 is connected in return riser 14 and causes circulation in a closed loop including boiler 11, risers 12 and 14 and supply main 13, as is known in the art.

The main 13 is adapted to supply heated water to a typical radiation structure 17 connected at its upstream end to main 13 by a branching supply pipe 18, and at its downstream end by a branching return pipe 19. Irrespective of whether such branching pipe is a supply or return one, it is made to the supply main 13 by structure which will now be described.

Referring now to the remaining figures of the drawing, the supply or return pipe to the radiation structure 17 is made by first drilling or punching an opening 21 in the supply main 13 as seen in FIG. 2. A saddle fitting 22 is formed from sheet stock in a stamping operation, and preferably includes a widened central portion 23 with ear or tab portions 24 extending in opposed and divergent directions therefrom. As a part of the forming operations of the saddle fitting 22, it is provided with a central ferrule 26 having an I.D. corresponding to the O.D. of a branching pipe 18 adapted to be connected thereat, and embossed tool engaging protuberances 27 adapted to be engaged by a saddle fitting deforming tool as will be described.

After being formed as seen in FIGS. 3 and 4, the saddle fitting 22 is further formed to conform to the O.D. of the main 13 as seen in FIG. 7. The saddle fitting is preferably heavily tinned or coated with a heavy coat of solder in any suitable manner so that the same can be soldered to the main 13, which in the usual case is made from copper tubing.

The branching pipes 18 or 19 are adapted to be connected to the main 13 at the saddle fitting 22, preferably in a soldering operation, but these are suitably deformed near the ends thereof to limit the amount of penetration into the main 13. To this end, and as seen in FIGS. 5 and 6, the branching pipes 18 or 19 are each deformed slightly with a small boss 28 which is spaced a proper distance from the end of connecting pipe 18, 19. This is accomplished by a deforming tool 29 seen in FIG. 6 having small jaws 31 and 32 with a respective complementary boss 33 and recess 34. Jaw 31 is adapted to enter branch pipe 18, 19, and when the jaws are brought together the small boss 28 is formed on the branching pipes 18, 19, as the case may be, a desired distance from the end thereof.

The making of a connection between the main 13 and the branching pipe is simply and rapidly made in the field. After drilling or punching the opening 21, the main 13 is properly cleaned to remove any oxides or other material not conducive to making a good bond of the saddle fitting 22 to main 13. Saddle fitting 22 is then placed on main 13 with the ferrule 26 thereof in register with opening 21 as seen in FIG. 7. A suitable clamping device 35, as for example, a locking type of pliers known generally as a "Vise Grip," and having adjustable jaws 36 and 37, is adapted to engage the ears 24 of saddle fitting 22 at the protuberances 27 thereon.

The saddle fitting 22 is then snugly wrapped around main 13 so that ears 24 closely embrace the same to adopt the dotted line position seen in FIG. 7.

The branching pipe seen in FIG. 5 is likewise cleaned as was the main 13, and then inserted into the ferrule 26. The arms and hands of the field assembler are then free to complete a soldered fluid tight connection of the saddle fitting 22 and the branching pipe to main 13.

It should be borne in mind that while the invention has been described in terms of making a field connection by a soldering operation with the saddle fitting heavily tinned or coated with solder, it is entirely within the scope of the invention that the invention be practiced in the field with a brazing or welding operation, and in such cases the parts making up the assemblage are not so tinned or coated with solder.

Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

We claim:

A saddle fitting for making a connection with a main and a branching pipe, said saddle fitting having a central portion with an internal radius and a contour corresponding to the O.D. of said main, said fitting and said pipe being made of a metal capable of being soldered, a ferrule integral therewith and extending therefrom and aligned with an opening in said main when said saddle fitting is placed on said main, a pair of tabs integral with said central portion and extending therefrom in divergent directions so that said central portion can be placed on said main over said opening therein with said ferrule in register with said opening, said tabs and said central portion combined being of a length to encompass more than half the outside circumference of said main, each of said tabs being deformed about said main so as closely to embrace the same, each of said tabs being provided with small protuberances extending outwardly from the surface of said main, and releasable means engageable with each of said tabs during assembly of said saddle on said main to exert a substantially constant pressure radially inwardly and in a direction opposite from said ferrule to cause said tabs to deform about said main and to retain said tabs so deformed to thereby provide capillary flow while said branch is soldered to said main.

References Cited by the Examiner
UNITED STATES PATENTS

| | | | |
|---|---|---|---|
| 1,659,470 | 2/1928 | Owen | 285—197 X |
| 1,908,821 | 5/1933 | Cornell | 285—197 |
| 2,527,227 | 10/1950 | Namet | 285—382 |
| 2,738,990 | 3/1956 | Hill | 285—128 |

CARL W. TOMLIN, *Primary Examiner.*